April 8, 1958 — F. R. ANDERSON — 2,829,377
DIAPER RINSING DEVICE
Filed June 20, 1955

INVENTOR.
Foster Anderson
BY
Atty.

United States Patent Office 2,829,377
Patented Apr. 8, 1958

2,829,377

DIAPER RINSING DEVICE

Foster R. Anderson, Eugene, Oreg.

Application June 20, 1955, Serial No. 516,378

2 Claims. (Cl. 4—1)

This invention relates to a device which is particularly useful for rinsing out soiled diapers.

Soiled diapers are usually rinsed out by hand in the bowl of a toilet. In order to perform this satisfactorily, it is necessary to get one's hands down into the bowl and water. Any mother can testify that the rinsing out of diapers is not only an unpleasant chore but also harmful to the hands, producing rough and chapped skin, and sometimes skin infections. There has therefore existed a long standing problem in the rinsing out of diapers.

It is the object of the present invention to solve this problem by providing a simple device which may be readily connected to a toilet bowl and which will enable one to rinse out a diaper without the necessity of touching it with one's hands.

Generally the object of the invention is accomplished by providing a perforated container which is detachably mounted on the rim of the toilet bowl and hangs inside the bowl in operative position. A rod associated therewith is employed to agitate a soiled diaper in the water in the bowl and deposit the diaper in the container. The rod is next employed to press down on the diaper and squeeze out the excess water and then the diaper is removed from the container by the rod to be placed in any convenient receptacle.

The invention will be explained in greater detail with reference to the drawings, in which.

Figure 1:
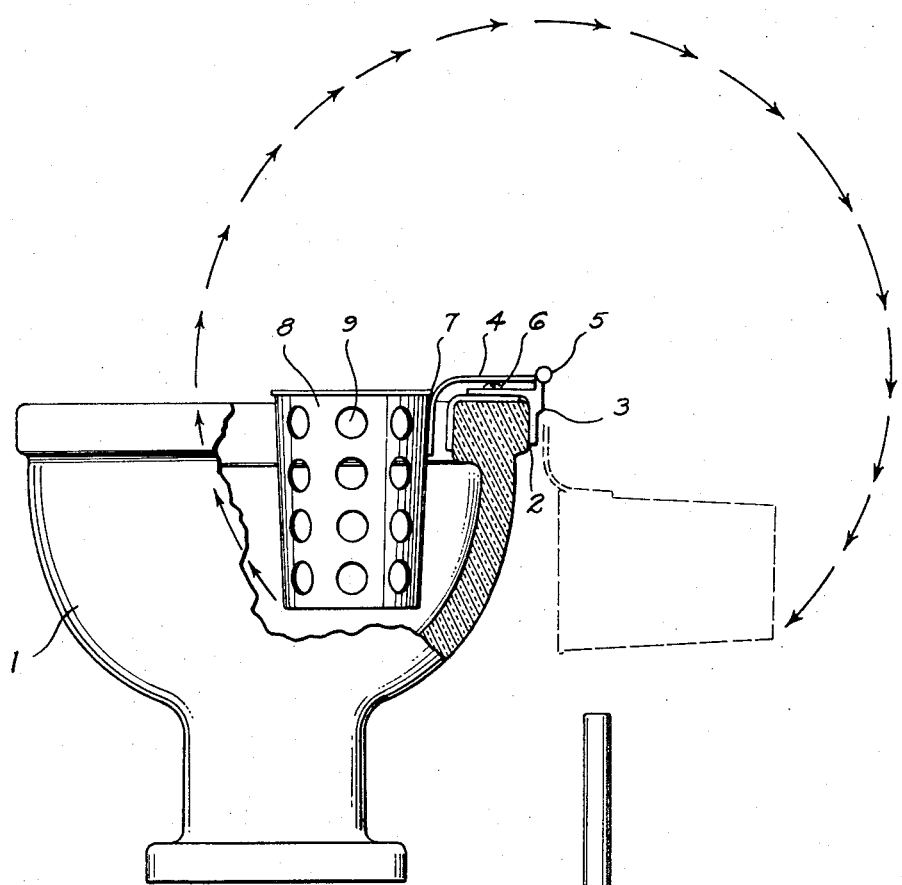
Fig. 1 is a side elevation partly broken away and in section of the device mounted on the rim of a toilet bowl.

Referring to the drawings, 1 is a conventional type toilet bowl having a rim 2 which is engaged by a mounting bracket 3. An arm 4 is hingedly connected at 5 to bracket 3 which is held together by screw 6. The other end of arm 4 is fastened substantially at right angles to upper edge 7 of a basket 8, preferably of metal, having a plurality of perforations 9 in its sides and bottom. The size of basket 8 is such as comfortably to accommodate the usual baby diaper. The basket is suspended inside the toilet bowl so that when the water is at its normal level in the bowl it will be below the bottom of the basket. However, when the bowl is flushed, water will rise into the basket.

As shown in Fig. 1, basket 8 has an operative position shown in solid lines wherein it is hung inside the toilet bowl and an inoperative position shown in dotted lines, Fig. 1, wherein it may be swung up and out of the inside of the toilet bowl, as shown by the arrows, to hang on the outside of the bowl when it is desired otherwise to use the toilet.

Figure 2:
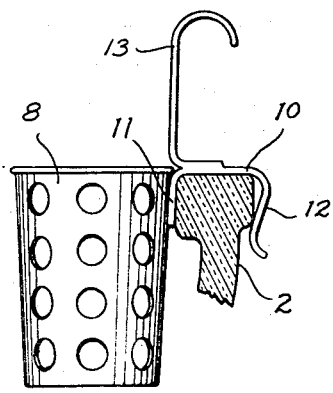
Fig. 2 is a side view of an alternative embodiment of the device.

In the embodiment shown in Fig. 2, basket 8 is like the basket of Fig. 1, except that in the place of the hinged mounting for the basket, a clasp type bracket 10 has been substituted. Legs 11, 12 of bracket 10 may conveniently be made from resilient or spring-like material so that they act as a yieldable clamp for engaging rim 2. A handle or hook 13, upstanding from bracket 10, is employed for moving the basket from operative position into inoperative position and vice versa. The device may be conveniently hung in inoperative position from hook 13 on the side of the water tank in back of the toilet bowl, or in any other desired location.

Figure 3:
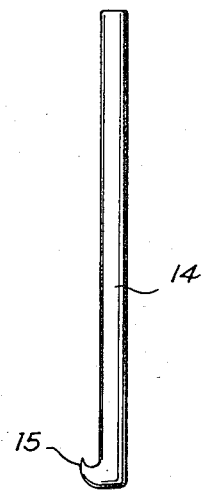
Fig. 3 is a plan view of the rod employed with the device.

Fig. 3 shows a stick or rod 14 which has a small hook 15 in one end and is employed in place of one's hands in rinsing out a diaper, placing it in the container, squeezing water out of it and removing the diaper from the container.

The manner in which the device is used is as follows: a soiled diaper is deposited in the water in the toilet bowl. Rod 14 is employed to agitate the diaper and slush it around in the water until it is clean or sufficiently rinsed. The diaper is picked up by hook 15 and deposited in basket 8. If it is desired to subject the diaper to further rinsing action, the toilet may be flushed and water will pass through the basket and diaper. The diaper is next wrung out by pushing down on it in the basket with rod 14 to squeeze the excess water out. When this is completed, the rinsed diaper may again be lifted by means of hook 15 on the rod and deposited in a diaper pail or any other suitable receptacle.

It will be appreciated from the foregoing that the device, according to the present invention, provides a mother with means for effectively and quickly rinsing out a diaper without having to put her hands in water and her contact with the soiled diaper is reduced to a minimum. The device is used in conjunction with apparatus which is commonly employed for diaper rinsing, i. e. a toilet bowl, and is readily attachable thereto. Therefore it takes no special skill, training, or adaptation for one to use the present device since it accommodates itself so well into an everyday activity of a mother having young children.

The present invention will suggest to those skilled in the art, other embodiments, changes, modifications, and improvements, and it is intended to cover all these and to limit the invention only as defined in the appended claims.

I claim:

1. Apparatus for rinsing and wringing out wet diapers comprising in combination a toilet bowl having a rim along its top defining an opening for the bowl, flushable water in said bowl having a water level spaced below the top of said bowl, a perforated container within said bowl spaced above said water level and to one side of the opening of the bowl, the peripheral outline of said container being substantially smaller than said opening whereby a portion of said opening presents access to the water in said bowl, and mounting means fixing said container to the rim of said bowl, said last-mentioned means comprising a bracket secured at one end to one side of said container and having at its other end a clamp portion fitting over the rim of said bowl.

2. Apparatus as claimed in claim 1, and a rod separable from but fitting within said container for wringing a diaper in said container by compressing a diaper therein.

References Cited in the file of this patent

UNITED STATES PATENTS

| | | |
|---|---|---|
| 712,492 | Broga | Nov. 4, 1902 |
| 944,071 | Brewer | Dec. 21, 1909 |
| 1,374,338 | Syverson | Apr. 12, 1921 |
| 1,691,858 | Ryerson | Nov. 13, 1928 |
| 2,222,314 | Husk | Nov. 19, 1940 |
| 2,315,750 | Wakefield | Apr. 6, 1943 |
| 2,660,772 | Ehrdhardt | Dec. 1, 1953 |
| 2,740,970 | Fagundus | Apr. 10, 1956 |
| 2,743,023 | Larson | Apr. 24, 1956 |